(12) United States Patent
Shirakawa et al.

(10) Patent No.: US 10,876,504 B2
(45) Date of Patent: Dec. 29, 2020

(54) SILENCER HAVING EXPANSION CHAMBER AND PARTITION

(71) Applicant: TIGERS POLYMER CORPORATION, Osaka (JP)

(72) Inventors: Akiwo Shirakawa, Hyogo (JP); Hiroaki Suwa, Hyogo (JP)

(73) Assignee: TIGERS POLYMER CORPORATION, Osaka (JP)

( * ) Notice: Subject to any disclaimer, the term of this patent is extended or adjusted under 35 U.S.C. 154(b) by 430 days.

(21) Appl. No.: 15/901,395

(22) Filed: Feb. 21, 2018

(65) Prior Publication Data

US 2019/0032612 A1 Jan. 31, 2019

(30) Foreign Application Priority Data

Jul. 26, 2017 (JP) .................. 2017-144345
Aug. 17, 2017 (JP) .................. 2017-157411

(51) Int. Cl.
*F02M 35/12* (2006.01)
*G10K 11/172* (2006.01)
*B60H 1/00* (2006.01)

(52) U.S. Cl.
CPC ..... *F02M 35/1255* (2013.01); *B60H 1/00564* (2013.01); *F02M 35/1233* (2013.01); *B60H 1/00507* (2013.01); *B60H 2001/006* (2013.01)

(58) Field of Classification Search
CPC ............... F02M 35/12; F02M 35/1211; F02M 35/1216; F02M 35/1233; F02M 35/1255; F02M 35/1277; F02M 35/1205; F02M 35/14; F02M 35/1261; B60H 2001/006; G10K 11/16; G10K 11/172; F24F 13/24; F24F 2013/245; F16L 55/02; F16L 55/02718; F16L 55/02736; F16L 55/033
See application file for complete search history.

(56) References Cited

U.S. PATENT DOCUMENTS 4,346,781 A * 8/1982 Ingard .................. F16L 55/02
181/206
5,449,499 A * 9/1995 Bauer ................ B01D 53/8631
422/176
5,836,813 A * 11/1998 Miyata ............... B60H 1/00685
454/139

(Continued)

FOREIGN PATENT DOCUMENTS

JP H06081737 A 3/1994
JP 2009250183 A 10/2009

*Primary Examiner* — Edgardo San Martin
(74) *Attorney, Agent, or Firm* — Rankin, Hill & Clark LLP

(57) ABSTRACT

Provided is a silencer including: an expansion chamber having a cuboid shape; a first pipe for being coupled to a noise source, the first pipe being coupled to an approximate center of a first surface of the expansion chamber; and a second pipe coupled to an approximate center of a second surface of the expansion chamber adjacent to the first surface. The expansion chamber has an internal space and a partition in the internal space, the partition is disposed upright on a third surface of the expansion chamber opposed to the second surface of the expansion chamber to extend from the third surface toward the second surface, and the second pipe has a central axis substantially included in the partition.

12 Claims, 14 Drawing Sheets

(56) References Cited

U.S. PATENT DOCUMENTS

| | | | | |
|---|---|---|---|---|
| 6,386,966 B1* | 5/2002 | Kuwayama | B60H 1/00514 | 181/225 |
| 6,688,425 B2* | 2/2004 | Cole | F02B 33/44 | 181/264 |
| 7,350,496 B2* | 4/2008 | Nakayama | F02M 35/125 | 123/184.57 |
| 7,383,810 B1* | 6/2008 | Emley | F02M 35/1255 | 123/184.57 |
| 8,146,706 B2* | 4/2012 | Katoh | B60H 1/00564 | 138/115 |
| 8,342,922 B2* | 1/2013 | Deneau | B60H 1/00849 | 454/156 |
| 8,813,708 B2* | 8/2014 | Miller | F02M 35/1211 | 123/184.22 |
| 9,908,384 B2* | 3/2018 | Ueno | B60H 1/00564 | |
| 10,245,919 B2* | 4/2019 | Yamanaka | F04D 29/422 | |
| 10,539,066 B1* | 1/2020 | Owen | F02M 35/1288 | |
| 2020/0063700 A1* | 2/2020 | Schwarz | F02B 29/045 | |

\* cited by examiner

SILENCER HAVING EXPANSION CHAMBER AND PARTITION

CROSS-REFERENCE TO RELATED APPLICATION

This application claims priority from Japanese Patent Application No. 2017-144345 filed with the Japan Patent Office on Jul. 26, 2017, and Japanese Patent Application No. 2017-157411 filed with the Japan Patent Office on Aug. 17, 2017, the entire contents of which are hereby incorporated by reference.

BACKGROUND

1. Technical Field

This disclosure relates to a silencer.

2. Related Art

In an air flow pipe (what is called an air duct, an air flow duct, an air flow hose, or the like) of an intake system of an internal combustion engine for automobile, an air conditioning system, a cooling air delivery system, and the like, reduction of noise transmitted from an engine, a fan, a motor, or the like has been previously anticipated. The cause of such noise is that the sound is transmitted through an air flow passageway, or that air column resonance occurs in the air flow pipe.

To address such noise transmitted into an air flow passageway of the intake system or the air flow pipe, a technique that disposes an expansion chamber as a silencing component has been well known. The disposition of the expansion chamber that suddenly changes a cross section of the air flow passageway changes impedance at a part where an air-flow cross-sectional area suddenly changes. This restrains the transmission of the noise. However, it was difficult for the technique of the expansion chamber to effectively muffle the noise in a specific frequency range.

As a technique that muffles the noise having a specific frequency in the air flow passageway, a resonance-type silencer has been known.

For example, JP-A-06-081737 discloses a resonance apparatus that is a Helmholtz-type resonator having a resonant chamber and a communication portion. The resonance apparatus where sound-absorbing materials are disposed in the communication portion and the resonant chamber is disclosed. JP-A-2009-250183 discloses a resonator configured to have an extension portion (a resonant chamber) and a slit-like communication hole along a pipe line. It is disclosed that a sound-absorbing material is disposed in this resonant chamber. With these techniques, the resonator can muffle the noise having the specific frequency band, and the sound-absorbing material can enhance silencing effect.

SUMMARY

A silencer according to an embodiment of the present disclosure includes: an expansion chamber having a cuboid shape; a first pipe for being coupled to a noise source, the first pipe being coupled to an approximate center of a first surface of the expansion chamber; and a second pipe coupled to an approximate center of a second surface of the expansion chamber adjacent to the first surface. The expansion chamber has an internal space and a partition in the internal space, the partition is disposed upright on a third surface of the expansion chamber opposed to the second surface of the expansion chamber to extend from the third surface toward the second surface, and the second pipe has a central axis substantially included in the partition.

DETAILED DESCRIPTION

Figure 1:
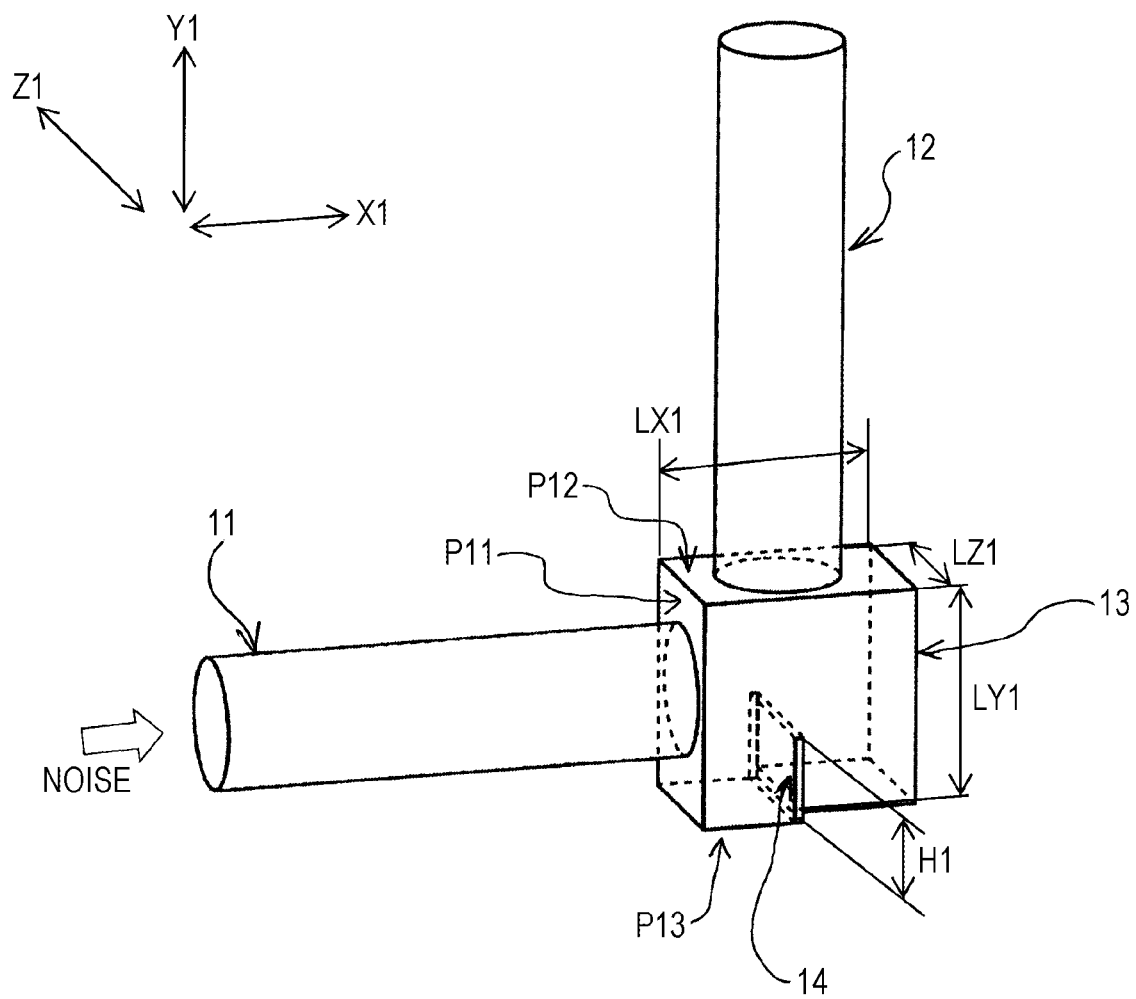
FIG. 1 is a perspective view illustrating a silencer in a first embodiment.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Such an expansion chamber and a resonance-type silencer take respective predetermined volumes. To ensure saving space for the silencer, a silencer that has a combination of silencing characteristics of the expansion chamber and silencing characteristics of the resonance-type silencer is anticipated. However, its achievement is difficult.

A purpose of this disclosure is to provide a silencer including an expansion chamber configured to effectively enhance silencing characteristics around a specific frequency.

The inventors have obtained the following knowledge in consequence of serious examination. With this knowledge, when an extension-chamber type silencer including two pipes coupled to specific positions of an expansion chamber having a cuboid shape has a partition having a specific form inside this expansion chamber, the silencing characteristics around the specific frequency are effectively enhanced. Based on this knowledge, a silencer in this disclosure has been completed.

A silencer according to the first embodiment of the present disclosure is a silencer including: an expansion chamber having a cuboid shape; a first pipe for being coupled to a noise source, the first pipe being coupled to an approximate center of a first surface of the expansion chamber; and a second pipe coupled to an approximate center of a second surface of the expansion chamber adjacent to the first surface. The expansion chamber has an internal space and a partition in the internal space, the partition is disposed upright on a third surface of the expansion chamber opposed to the second surface of the expansion chamber to extend from the third surface toward the second surface, and the second pipe has a central axis substantially included in the partition.

In the silencer according to the first embodiment, it is preferable that the partition have a height in a normal direction of the second surface in a range of ¼ to ⅔ of a length of the expansion chamber measured in the normal direction of the second surface.

A silencer according to the second embodiment of the present disclosure is a silencer including: an expansion chamber having a cuboid shape; a first pipe for being coupled to a noise source, the first pipe being coupled to an approximate center of a first surface of the expansion chamber; and a second pipe coupled to an approximate center of a second surface of the expansion chamber adjacent to the first surface. The expansion chamber has an internal space and a partition in the internal space, the partition is disposed upright on a third surface of the expansion chamber opposed to the first surface of the expansion chamber to extend from the third surface toward the first surface, and the first pipe has a central axis substantially included in the partition.

In the silencer according to the second embodiment, it is preferable that the partition have a height in a normal direction of the first surface in a range of ⅕ to ⅔ of a length of the expansion chamber measured in the normal direction of the first surface.

With the silencer in these embodiments, even the silencer including the expansion chamber ensures the effectively enhanced silencing characteristics around the specific frequency. Especially, when the silencer has the partition having a specific height, the silencing characteristics around the specific frequency is more effectively enhanced.

The following describes the embodiment of this disclosure, taking a silencer used as a part of an intake system that supplies air to an engine of an automobile as an example, by referring to the drawings. The embodiment of this disclosure is not limited to individual embodiments described below. The individual embodiments can be changed to be performed as other embodiments of this disclosure.

Figure 2:
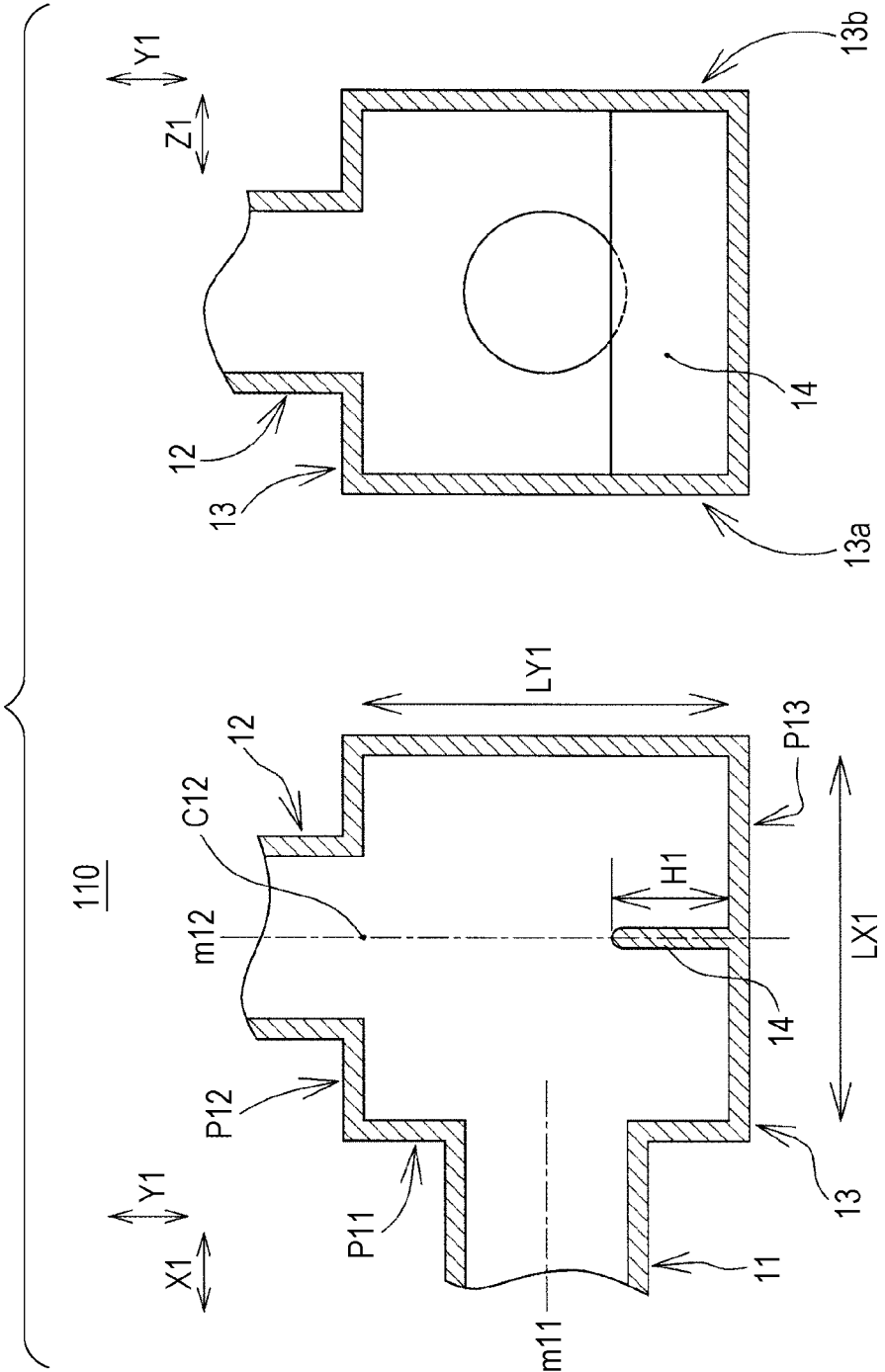
FIG. 2 is a cross-sectional view illustrating a structure of an expansion chamber in the first embodiment.

FIG. 1 is a perspective view illustrating a silencer 110 in the first embodiment. FIG. 2 is a cross-sectional view of an expansion chamber 13. To the expansion chamber 13 of the silencer 110, two air flow pipes (hereinafter also referred to as "pipes") 11 and 12 are coupled. An internal space of the first pipe 11, an internal space of the expansion chamber 13, and an internal space of the second pipe 12 are sequentially coupled to constitute a stretch of air flow passageway. The air passes through this air flow passageway. In the silencer 110, at coupling positions of the pipes 11 and 12 to the expansion chamber 13, a cross-sectional area of the internal space varies. Thus, the silencer 110, as what is called an extension-chamber type silencer, acts to muffle the noise transmitted through the pipe.

When the silencer 110 is used, in the above-described intake system, for example, to an end of the second pipe 12, a duct member or the like of an intake port side is coupled. Then, to an end of the first pipe 11, a duct member or the like of an engine side is coupled. The intake system may include another silencer, or an air cleaner or the like. The silencer 110 is applicable to an air flow passageway of an air conditioner, an air flow passageway of an air cooling system of a battery or the like, and the like, in addition to the intake system of the internal combustion engine for automobile.

The air flow pipes 11 and 12 are hollow pipes. Specific pipe shapes of the air flow pipes 11 and 12 are determined depending on various usages. As necessary, the air flow pipes 11 and 12 are formed into straight-pipe shapes, curving shapes, bent shapes, or the like. The air flow pipes 11 and 12 may be rigid pipes, or hoses having flexibility. The air flow pipes 11 and 12 are preferably formed of a material having air impermeability. However, a part or all of the air flow pipes 11 and 12 may be formed of a material having air permeability. On a part of the air flow pipes 11 and 12, a through-hole (for example, a drain hole or a tuning hole) communicated with the inside and outside of the pipe may be disposed.

The expansion chamber 13 having a hollow shape has a cuboid shape. Especially, the shape of the expansion chamber 13 is preferably square as viewed from a direction perpendicular to a central axis m11 of the first pipe 11 and a central axis m12 of the second pipe 12. The internal space of the expansion chamber 13 is not necessary to form a cuboid shape in a strict sense. A corner R, a draft taper, an inclination, or the like may be provided. Among surfaces that define the chamber having the cuboid shape, some surfaces may be formed into curved surfaces like a cylindrical surface, a spherical surface, or the like. It is only necessary that the internal space of the chamber forms a space having a cuboid shape as a whole. On the expansion chamber wall, a rib, a bead, or the like for reinforcement may be formed. The material of the expansion chamber 13 is not specifically limited. Typically, a material having the air impermeability, for example, thermoplastic resin such as polypropylene resin is preferably used.

The first pipe 11 is coupled to an approximate center of a first surface P11 of the expansion chamber 13. It is not necessary that the central axis m11 of the first pipe 11 at the coupling portion passes through the center of the first surface P11 in a strict sense. The central axis m11 may be out of the center of the surface P11. However, preferably, a distance between the center of the first surface P11 and the central axis m11 on the first surface P11 is 20% or less of a second-direction length LY1 described later of the chamber 13.

The second pipe 12 is coupled to an approximate center C12 of a second surface P12 of the expansion chamber 13 adjacent to the first surface P11. It is not necessary that the central axis m12 of the second pipe 12 at the coupling portion passes through the center C12 of the second surface P12 in a strict sense. The central axis m12 may be out of the center C12 of the surface P12. However, preferably, a distance between the center C12 of the second surface P12 and the central axis m12 on the second surface P12 is 20% or less of a first-direction length LX1 described later of the chamber 13. In the expansion chamber 13 having the cuboid shape, the second surface P12 adjacent to the first surface P11 is, comparing the expansion chamber 13 to a die, any of surfaces "2," "3," "4," and "5," when the first surface is a surface "1."

In other words, the first pipe 11 and the second pipe 12 are mounted on the expansion chamber 13 such that the respective central axes m11 and m12 at the coupling portions of these pipes are approximately perpendicular to one another.

The silencer 110, as a whole, has an air flow passageway bent to about 90 degrees at a part of the expansion chamber 13.

When the silencer 110 is used, an end of the first pipe 11 is coupled to a noise source. That is, when the silencer 110 is used in the intake system of the automobile engine, as described above, the first pipe 11 is coupled to the engine that is the noise source. An end of the second pipe 12 is coupled to the intake port side. When the silencer 110 is, for example, used in the air flow passageway of the air conditioner, the first pipe 11 is coupled to the fan or the motor that is the noise source.

An internal structure of the expansion chamber 13 will be described. Here, in FIGS. 1 and 2, it is defined that a normal direction of the first surface P11 of the expansion chamber 13 is a first direction X1, a normal direction of the second surface P12 of this chamber is a second direction Y1, and then, a direction perpendicular to the first direction X1 and the second direction Y1 is a third direction Z1. It is preferable that the central axis m11 of the first pipe 11 near the coupling portion be parallel to the first direction X1, and further, the central axis m12 of the second pipe 12 near the coupling portion is parallel to the second direction Y1.

Inside the expansion chamber 13, on a third surface P13 opposed to the second surface P12 of this chamber, a partition 14 is disposed upright extending in the second direction Y1 from this surface toward the second surface P12. That is, the partition 14 is disposed in the internal space of the expansion chamber 13 such that the partition 14 extends from the third surface P13 toward the second surface P12. Here, the third surface P13 opposed to the second surface P12 is, comparing the expansion chamber 13 to the die, a surface "6," when the second surface P12 is the surface "1."

As illustrated in a right-side view in FIG. 2, as viewed from a direction of the central axis m11 of the air flow pipe 11, the partition 14 is disposed to be continuous with right and left sidewalls 13a and 13b of the expansion chamber 13. In the right-side view in FIG. 2, a lower portion of the internal space of the expansion chamber 13 is partitioned into a front side and a back side in a depth direction of the paper by the partition 14. Thereby, as in a left-side view in FIG. 2, as viewed from the third direction Z1, the internal space of the expansion chamber 13 partially partitioned by the partition 14 has an inverted U shape whose lower side is open.

Then, for a position in the first direction X1 of the partition 14 on the third surface P13, such that the central axis m12 of the second pipe 12 is substantially included in the partition 14, the partition 14 is disposed on the third surface P13. The central axis m12 of the pipe 12 is not necessarily completely included in the partition 14. To the extent that the advantageous effect of the silencer in this embodiment is not undermined, the partition 14 may be inclined with respect to the central axis m12. The central axis m12 is not necessarily included in the partition 14 in a strict sense. However, in this case, the shortest distance between the central axis m12 and the partition 14 is within 20% of the first-direction length LX1 of the expansion chamber 13.

A height H1 in the second direction Y1 of the partition 14 is preferably ¼ to ⅔ of the second-direction length LY1 of the expansion chamber 13, and more preferably ⅓ to ½.

The silencer 110 in the above-described first embodiment can be manufactured using a known manufacturing technology, for example, injection molding or blow molding of the thermoplastic resin. The expansion chamber 13 can be manufactured by blow molding, or by welding of two separate bodies produced by the injection molding. The air flow pipes 11 and 12 can be shaped by blow molding or the like. The expansion chamber 13 can be coupled to the air flow pipes 11 and 12 one another by known coupling structure or coupling method. The coupling portions of the expansion chamber 13 to the air flow pipes 11 and 12 are preferably sealed as necessary.

A description will be given of function and advantageous effect of the silencer 110 in the above-described first embodiment. The silencer 110 in the first embodiment provides silencing effect similar to that of a silencer including an ordinary expansion chamber, in a relatively low frequency range (for example, a frequency range with 1000 Hz or less). In a relatively high frequency range (for example, a frequency range with 1000 Hz to 2000 Hz), in the internal space of the expansion chamber 13 of the silencer 110, by the partition 14 having a specific form, a specific resonance mode appears at a specific frequency. This can effectively enhance the silencing characteristics around such a specific frequency.

The above-described advantageous effect will be described by comparing Working Example 1 with Comparative Example 1 using a result of acoustic analysis simulation.

Working Example 1

As a working example corresponding to the above-described embodiment, an acoustic model of the silencer having the following specification was created.

First pipe 11: a straight pipe having a diameter with 60 mm and a length with 230 mm Second pipe 12: a straight pipe having a diameter with 60 mm and a length with 250 mm Expansion chamber 13: first-direction length LX1=105 mm, second-direction length LY1=100 mm, and further, third-direction length LZ1=80 mm The first pipe 11 is coupled to the center of the first surface P11 of the chamber. The second pipe 12 is coupled to the center C12 of the second surface P12 of the chamber. The central axis m11 of the first pipe 11 substantially intersects with the central axis m12 of the second pipe 12.

The partition 14 is positioned on the third surface P13 in such a manner that the central axis m12 of the second pipe 12 is included in the partition 14. The height H1 of the partition 14=40 mm.

Comparative Example 1

For comparison, a silencer having an identical configuration except that the partition 14 is not disposed in the internal space of the expansion chamber 13 was created as an acoustic model. This acoustic model was used for Comparative Example 1.

Figure 8:
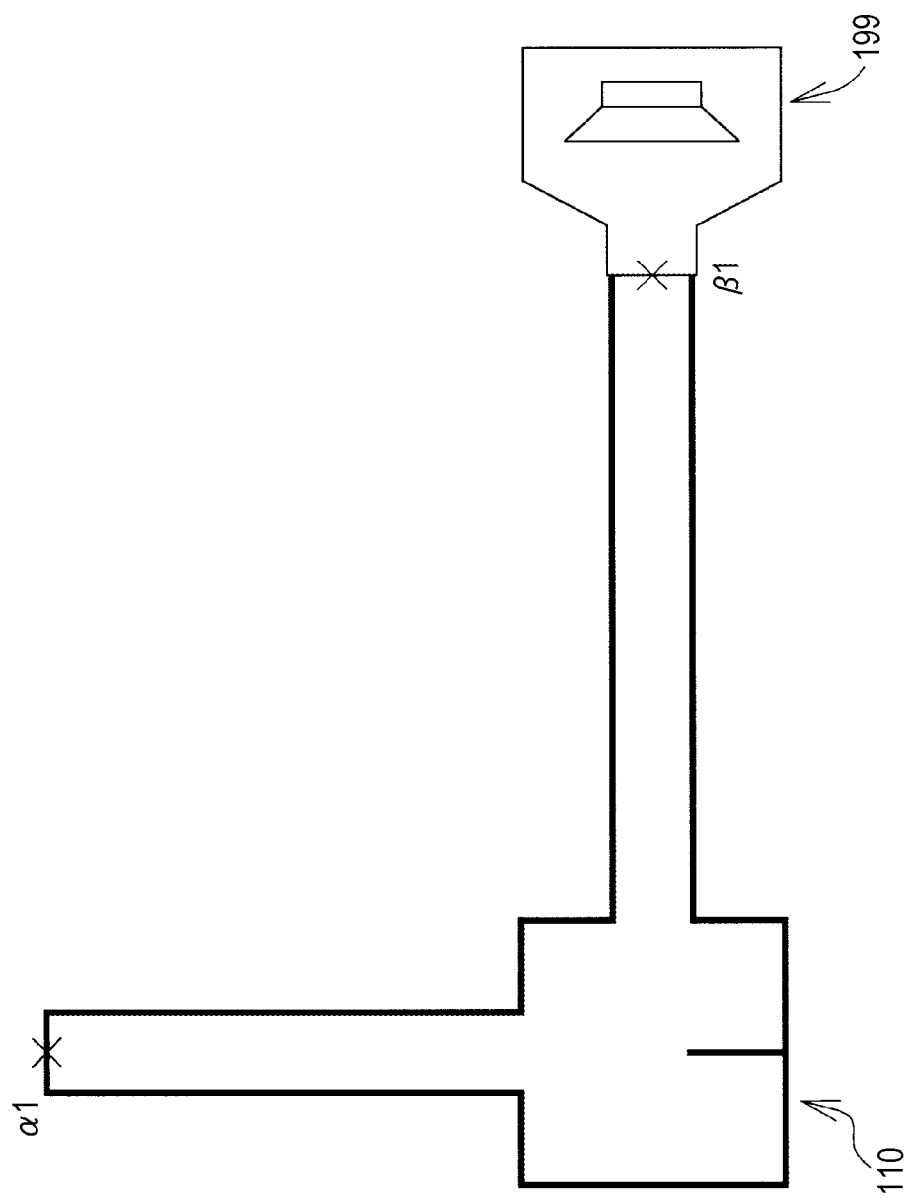
FIG. 8 is a schematic diagram illustrating a method that measures an amount of acoustic attenuation.

In Working Example 1 and Comparative Example 1, to examine their silencing effects, acoustic analysis was performed to obtain an amount of acoustic attenuation. The amount of acoustic attenuation is an index that evaluates the silencing effect. As in FIG. 8, assuming that an end (an end of the first pipe) β1 at the noise source side of the silencer as an examination object was coupled to a speaker device 199 that performs acoustic excitation, a simulation model that performs the acoustic excitation was created. An exit-side (an end opening α1 of the second pipe) sound pressure Pα1 (a sound pressure measured at the position α1) and a sound-source-side (a terminal portion β1 of the first pipe) sound pressure Pβ1 (a sound pressure measured at the position β1) were measured when the acoustic excitation was performed. A ratio (Pβ1/Pα1) of both was calculated as the amount of acoustic attenuation. A large value of the amount of acoustic attenuation means that the silencing effect is large. A small value of the amount of acoustic attenuation means that the silencing effect is small. The acoustic simulation was performed by a finite element method (FEM method).

Figure 3:
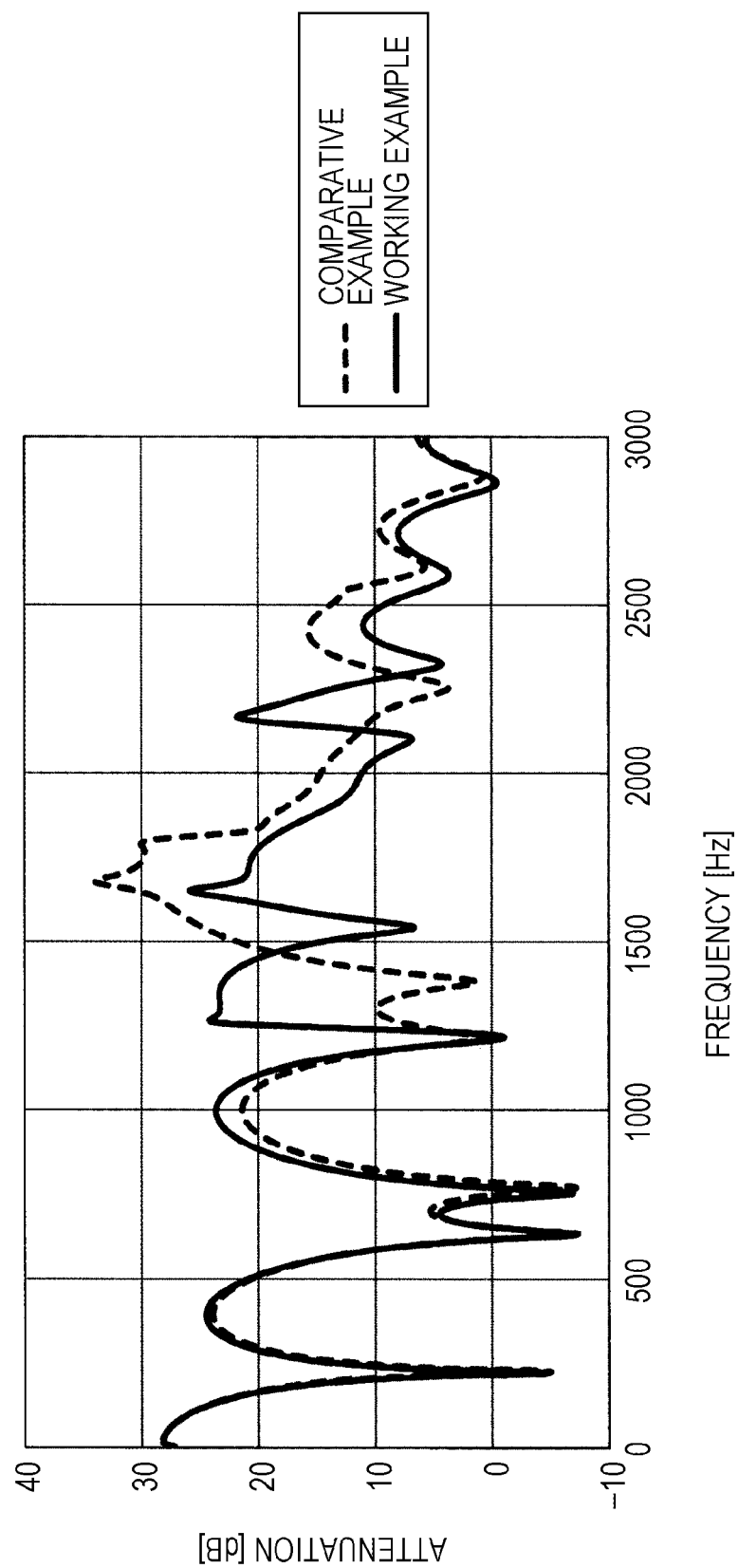
FIG. 3 is a view illustrating silencing effect of a working example of the silencer in the first embodiment.

FIG. 3 illustrates the simulation result of the amounts of acoustic attenuation in Working Example 1 and Comparative Example 1. In a region where the frequency is relatively low, up to almost 1000 Hz, in Working Example 1 and Comparative Example 1, almost identical amounts of acoustic attenuation (Attenuation in FIG. 3) are shown. It is understood that, in such a frequency range, the silencing effect similar to that of the silencer having the typical expansion chamber can be obtained.

In the silencer 110 in Working Example 1, compared with the comparative example, increase of the amount of acoustic attenuation whose peaks are at 1250 Hz (a first resonant frequency f11) and at 2200 Hz (a second resonant frequency f12) is seen. That is, in the frequency range (1200 Hz to 1450 Hz) around the first resonant frequency f11 and the frequency range (2150 Hz to 2250 Hz) around the second resonant frequency f12, the amount of acoustic attenuation of the silencer 110 in Working Example 1 is higher than that in Comparative Example 1.

Figure 4:
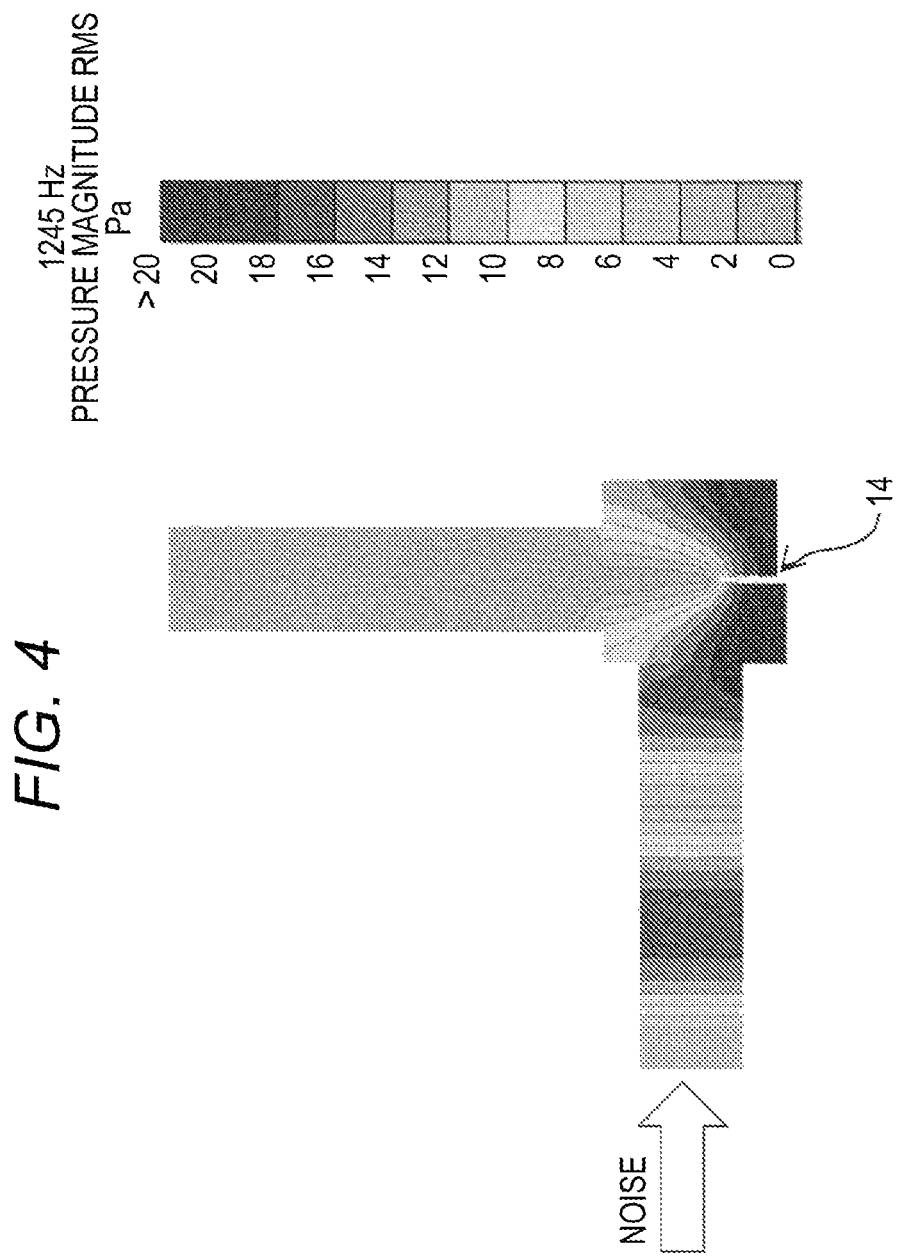
FIG. 4 is a view illustrating a resonance mode around a first resonant frequency in Working Example 1.
Figure 5:
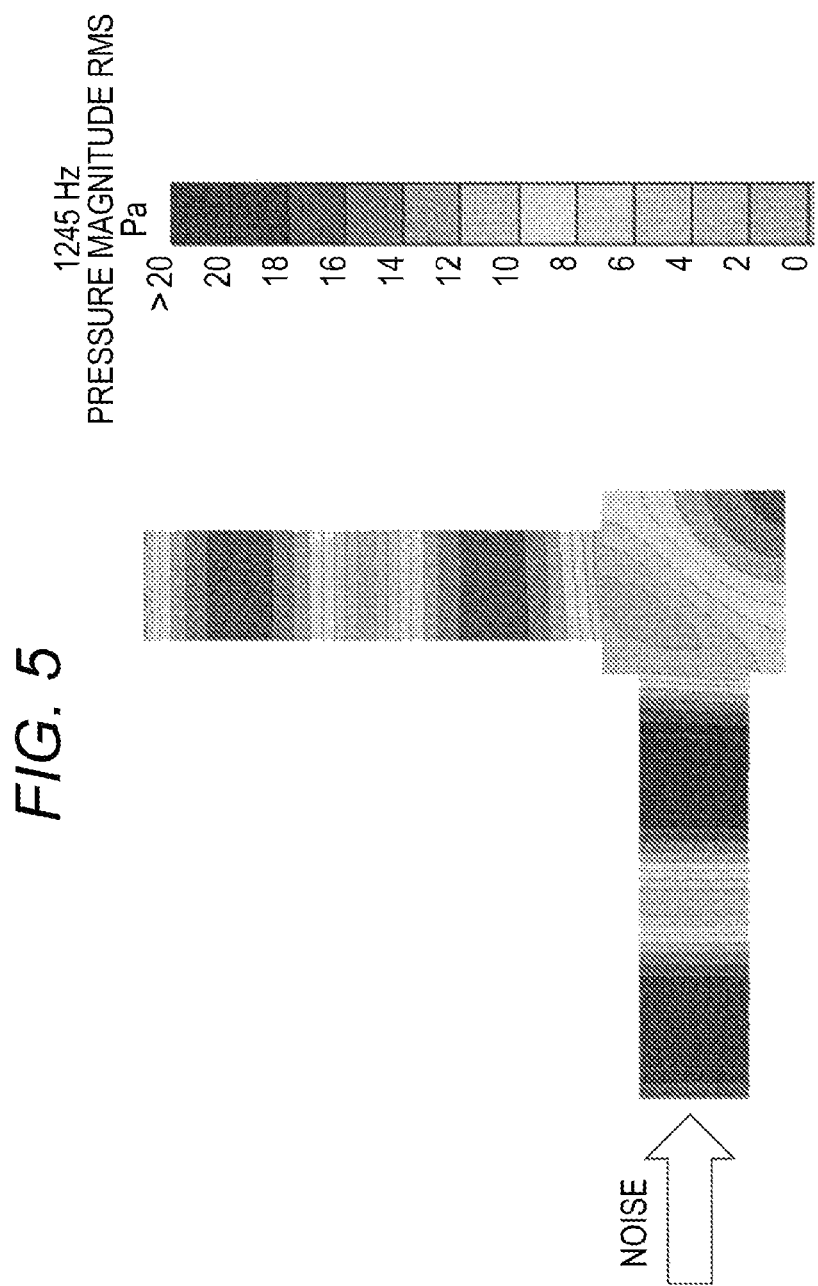
FIG. 5 is a view illustrating a resonance mode around a first resonant frequency in Comparative Example 1.

FIG. 4 illustrates a sound pressure distribution (resonance mode) inside the expansion chamber 13 in Working Example 1 around the first resonant frequency f11 (1245 Hz). FIG. 5 illustrates a result in Comparative Example 1. These sound pressure distributions are illustrated by sound-pressure distribution diagrams at a cross-sectional surface of the silencer 110 including the pipe central axes m11 and m12, as viewed from the third direction Z1.

The air resonance mode observed in Comparative Example 1, illustrated in FIG. 5, was analyzed. According to the analysis, the vibrating air moved upward/downward in a diagonal direction inside the expansion chamber from the upper left portion to the lower right portion of the chamber. That is, the sound pressure in the internal space of the expansion chamber was high in its lower right space, and decreased toward its upper left space. Due to a relationship between this resonance mode and positions of the coupling portions of the first pipe and the second pipe, in Comparative Example 1, a sound pressure having a level almost identical to that of the sound pressure occurring in the first pipe is also occurring in the second pipe. As a result, the decrease of the amount of acoustic attenuation is caused.

Meanwhile, in Working Example 1 illustrated in FIG. 4, the partition 14 is disposed in the expansion chamber 13. The partition 14 is disposed on the third surface P13 in such a manner that, as viewed from the third direction Z1, the internal space of the expansion chamber 13 partially partitioned by the partition 14 has the inverted U shape, more specifically, in such a manner that the central axis m12 of the second pipe 12 is substantially included in the partition 14. Therefore, the resonance mode at the first resonant frequency f11 varies. That is, according to the analysis of the resonance mode observed in Working Example 1, the sound pressure in the internal space of the expansion chamber 13 was high in its lower left space, and high in the opposite phase even in a lower right space partitioned by the partition 14. That is, the sound pressure decreased toward an upper space inside the expansion chamber 13. That is, in the internal space of the expansion chamber 13 partially partitioned by the partition 14 to have the inverted U shape, the air resonance mode, in which the air moves in a direction heading for its lower right via its lower left, upper left, and upper right, was occurring. That is, the resonance mode in which the sound pressure near the coupling portion to the second pipe 12 is low was occurring. In this resonance mode, near the coupling portion of the expansion chamber 13 to the second pipe 12, the air vibrates to flow in a direction perpendicular to the central axis m12 of the second pipe 12. Therefore, movement of the air between the second pipe 12 and the expansion chamber 13 is also less likely to occur.

With such a relationship between the resonance mode and the position of the coupling portions to the first pipe 11 and the second pipe 12, in Working Example 1, in the frequency range around the first resonant frequency f11, the sound pressure that occurs in the second pipe 12 is smaller than the sound pressure that occurs in the first pipe 11. This increases the amount of acoustic attenuation.

Thus, with the silencer 110 in the first embodiment, the partition 14 having the specific form disposed in the internal space of the expansion chamber 13 can generate the resonance mode to effectively enhance the amount of acoustic attenuation. As a result, the silencing characteristics can be enhanced around the specific frequency.

In view of generating the resonance mode as described above more effectively by disposing a partition, the height H1 of the partition 14 in the second direction Y1 is preferably ¼ to ⅔ of the second-direction length LY1 of the expansion chamber 13, more preferably ⅓ to ½. When the height H1 is small, the resonance mode as in FIG. 4 becomes less likely to appear. When the height H1 is too large, air flow resistance of the silencer 110 possibly increases.

The first resonant frequency f11 where the resonance mode as illustrated in FIG. 4 occurs can be adjusted as follows. When the first-direction length LX1 or the second-direction length LY1 of the expansion chamber is increased, the first resonant frequency f11 varies in a lower direction. When the height H1 of the partition 14 is increased, the first resonant frequency f11 varies in a slightly lower direction.

When the first-direction length LX1 and the second-direction length LY1 of the expansion chamber 13 are set to about 70 to 150 mm, and further, the height H1 of the partition 14 is set to about 25 to 70 mm, the first resonant frequency f11 can be moved to between 1000 Hz and 1500 Hz. As a result, as the silencer of the intake system for automobile engine including a turbocharger, especially preferred characteristics can be obtained.

Figure 6:
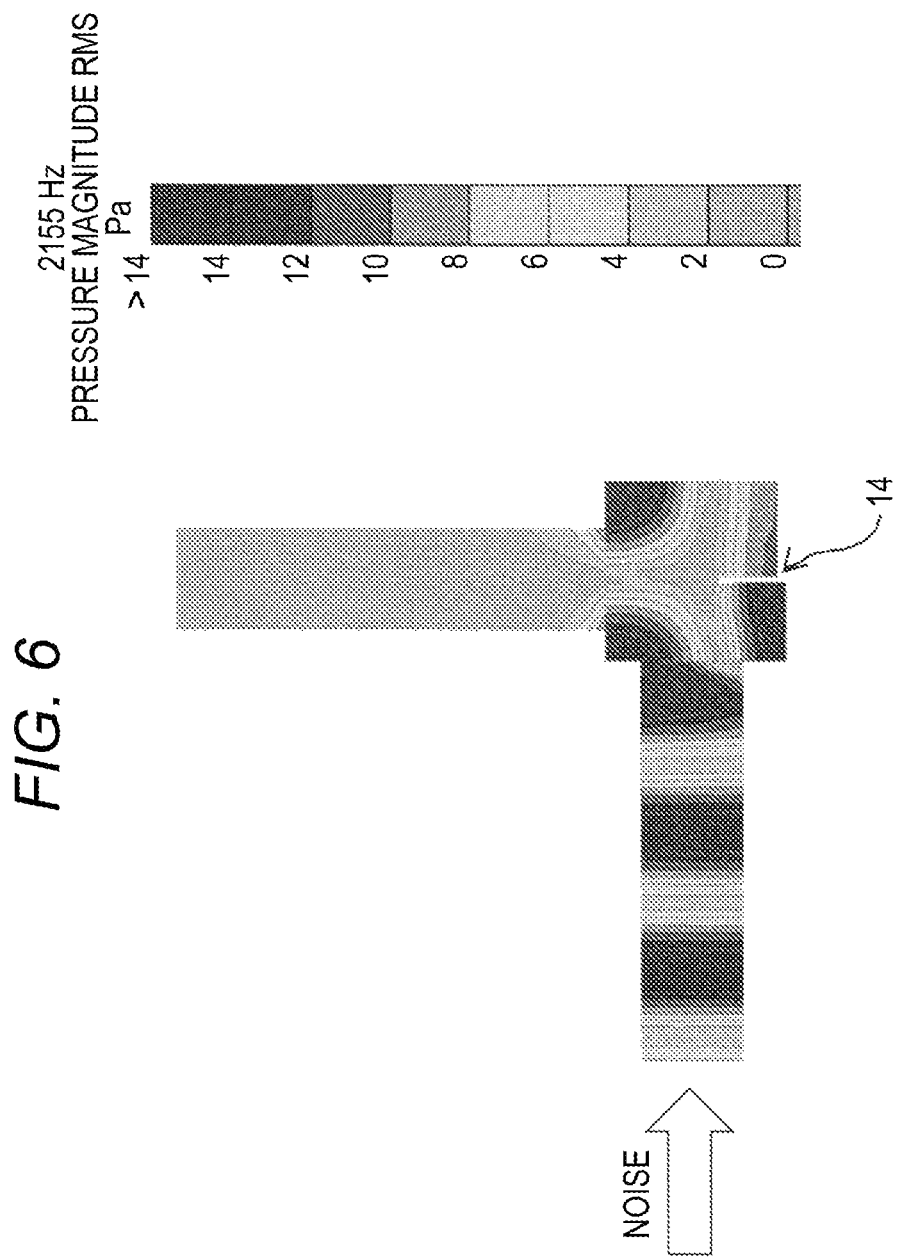
FIG. 6 is a view illustrating a resonance mode around a second resonant frequency in Working Example 1.
Figure 7:
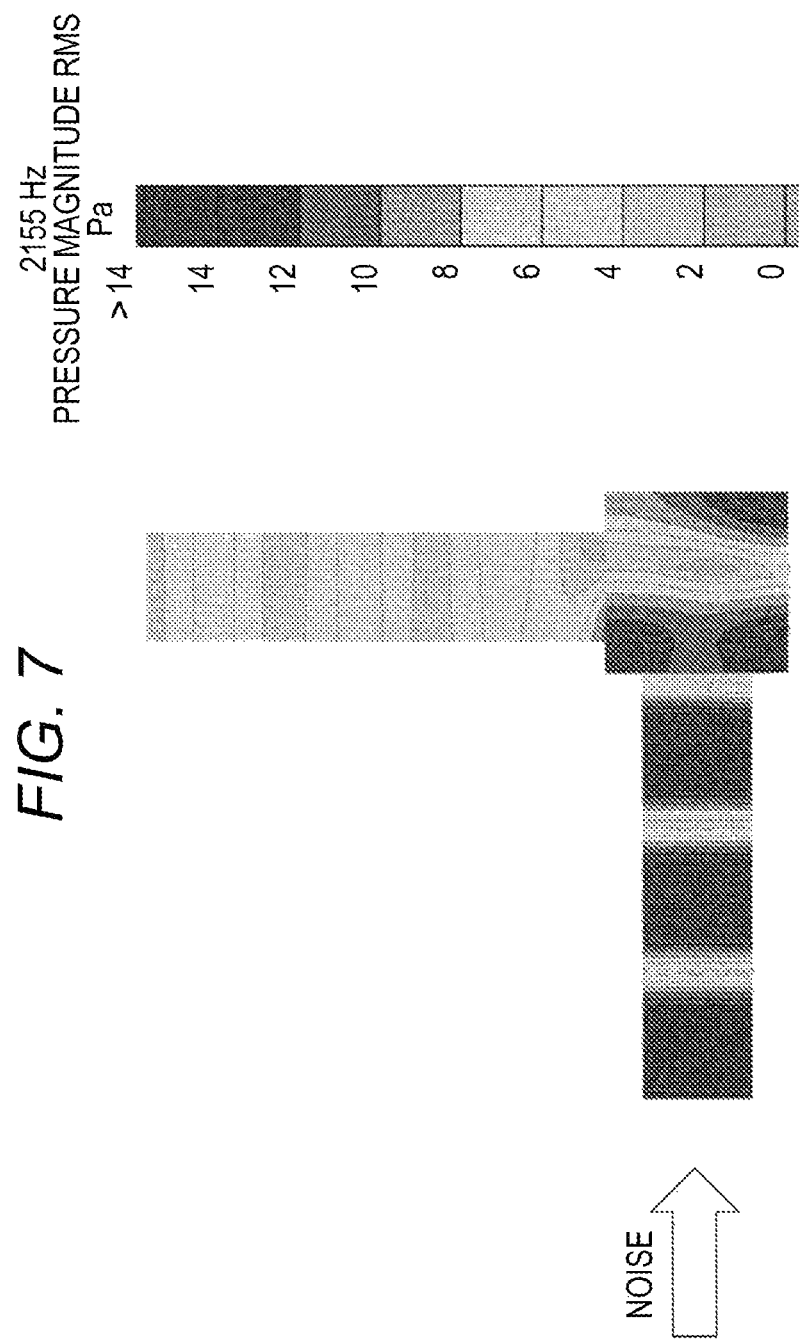
FIG. 7 is a view illustrating a resonance mode around a second resonant frequency in Comparative Example 1.

In above-described Working Example 1, improvement of the amount of acoustic attenuation is seen even around the second resonant frequency f12. FIG. 6 illustrates a sound pressure distribution (resonance mode) inside the expansion chamber around the second resonant frequency f12 (2155 Hz) in Working Example 1. FIG. 7 illustrates a corresponding result in Comparative Example 1.

In Comparative Example 1 in FIG. 7, the resonance mode is observed having a high sound pressure in a left-side space and a right-side space of the expansion chamber. The high sound pressure in the left-side space inside the chamber is transmitted to the second pipe to decrease the amount of acoustic attenuation.

Meanwhile, in Working Example 1 in FIG. 6, high sound pressure occurs in the lower left space and the upper right space. High sound pressure also occurs in the lower right and upper left spaces each in the opposite phase. In pans between them, regions where the sound pressure is low appear. Also in this mode, near the coupling portion of the expansion chamber 13 to the second pipe 12, the air vibrates to flow in the direction perpendicular to the central axis m12 of the second pipe 12. Therefore, between the second pipe 12 and the expansion chamber 13, the movement of the air is less likely to occur.

With such a relationship between the resonance mode and the position of the coupling portions to the first pipe 11 and the second pipe 12, in Working Example 1, also around the second resonant frequency f12, the sound pressure of the second pipe 12 is low. This increases the amount of acoustic attenuation. The improvement of the amount of acoustic attenuation around the second resonant frequency f12 is sometimes not significantly seen as much as in above-described Working Example 1. This is because the second resonant frequency f12 with that resonant mode is a relatively high frequency.

The embodiment of this disclosure is not limited to the above-described first embodiment. Various kinds of modification can be applied to the above-described first embodiment to be performed as another embodiment of this disclosure. The following describes another embodiment of this disclosure. In the following description, mainly, parts different from those in the first embodiment are described. The detailed description for the parts identical to those in the first embodiment is omitted. These other embodiments can be performed such that parts of them are combined or replaced one another.

Insofar as the resonance mode as described above occurs, the form of the partition 14 may be changed. For example, the partition 14 may be a plate-shaped partition disposed upright from the third surface P13 toward an inside of the expansion chamber, or may be a pleated partition formed so that a surface shape of the third surface P13 is folded inward.

In the first embodiment, the partition 14 has a flat-plate shape extending in the third direction Z1. However, the partition 14 may be curved. In the first embodiment, the height H1 of the partition 14 is constant in the third direction Z1. However, the height H1 of the partition 14 may be changed in the third direction Z1. It is not necessary that the partition 14 completely partitions a lower side part of the internal space of the expansion chamber 13. At the partition 14, a through-hole or a slit may be disposed.

In the description for the above-described first embodiment, the example where the silencer 110 is constituted of the pipes 11 and 12 and the expansion chamber 13 that are independent from other members has been shown. These pipes 11 and 12 or the expansion chamber 13 are not necessarily independent. The pipes 11 and 12 or the expansion chamber 13 may be integrated with other members. For example, a part of an air cleaner module included in the intake system for automobile engine, or a part of an air flow device of cooling air may constitute the above-described silencer 110. That is, the silencer 110 may be integrally incorporated in such an air cleaner module or an air flow device.

Figure 9:
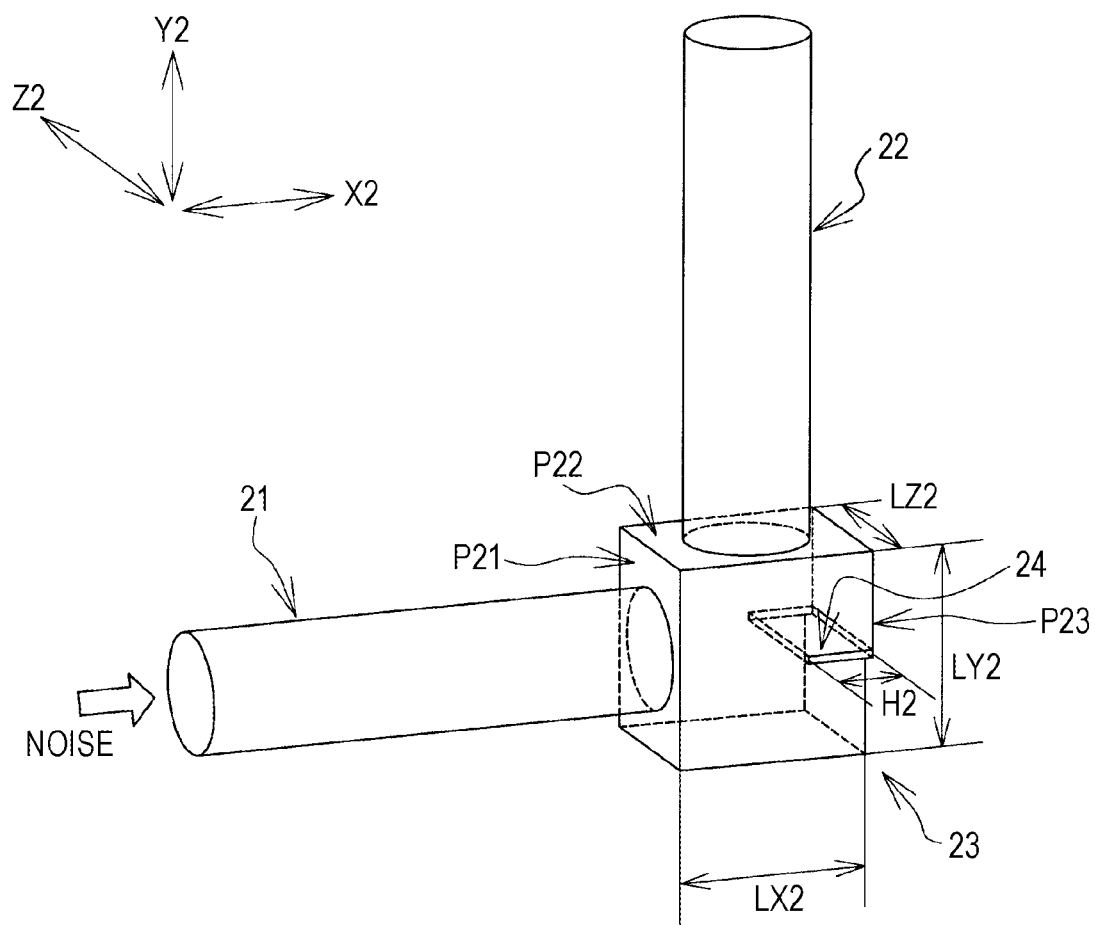
FIG. 9 is a perspective view illustrating a silencer in a second embodiment.
Figure 10:
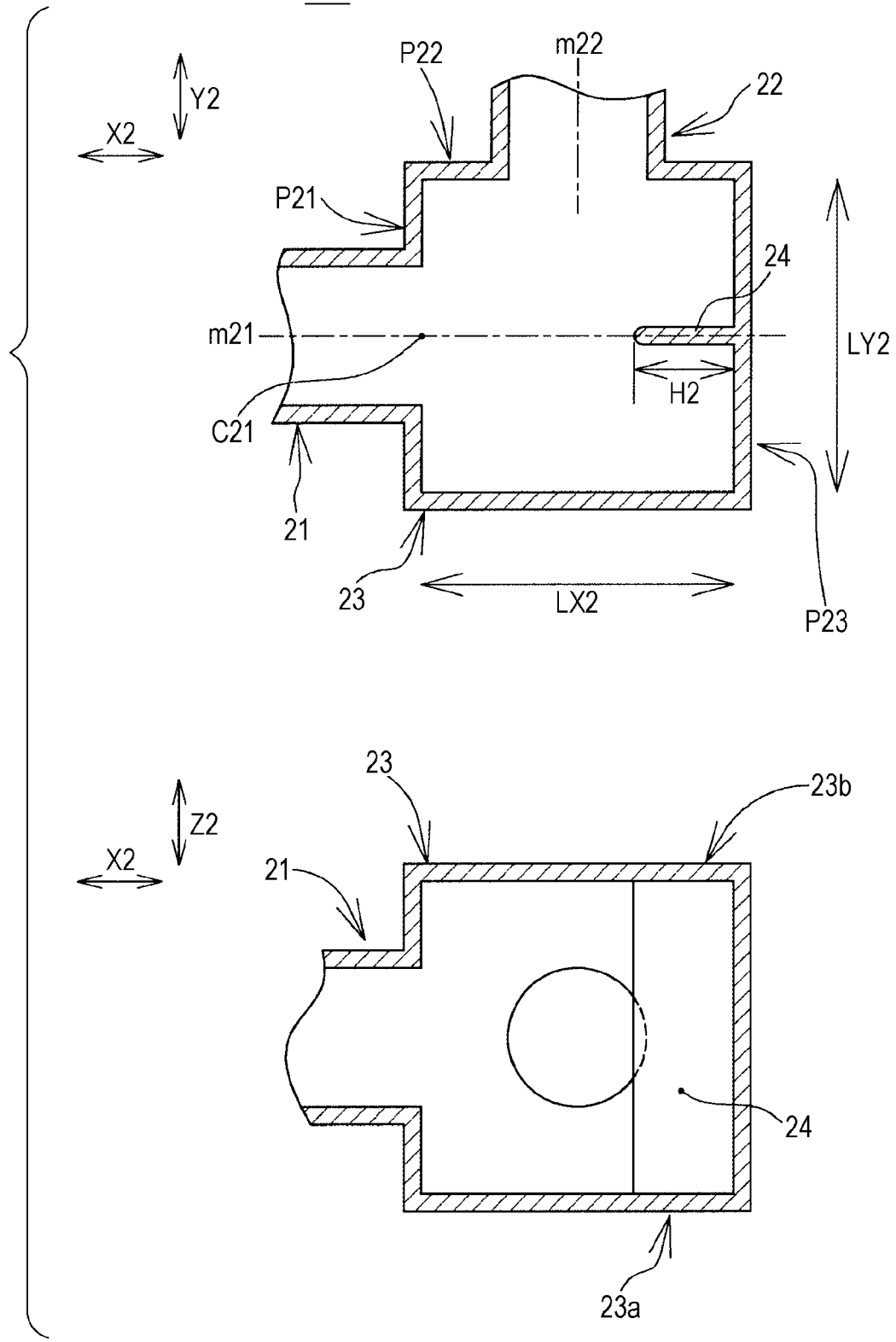
FIG. 10 is a cross-sectional view illustrating a structure of an expansion chamber in the second embodiment.

FIG. 9 is a perspective view illustrating a silencer 210 in the second embodiment. FIG. 10 is a cross-sectional view of an expansion chamber 23. To the expansion chamber 23 of the silencer 210, two air flow pipes (hereinafter also referred to as "pipes") 21 and 22 are coupled. An internal space of the first pipe 21, an internal space of the expansion chamber 23, and an internal space of the second pipe 22 are sequentially coupled to constitute a stretch of air flow passageway. The air passes through this air flow passageway. In the silencer 210, at coupling positions of the pipes 21 and 22 to the expansion chamber 23, a cross-sectional area of the internal space varies. Thus, the silencer 220, as what is called an extension-chamber type silencer, acts to muffle the noise transmitted through the pipe.

When the silencer 210 is used, in the above-described intake system, for example, to an end of the second pipe 22, a duct member or the like of an intake port side is coupled. Then, to an end of the first pipe 21, a duct member or the like of an engine side is coupled. The intake system may include another silencer, or an air cleaner or the like. The silencer 210 is applicable to an air flow passageway of an air conditioner, an air flow passageway of an air cooling system of a battery or the like, and the like, in addition to the intake system of the internal combustion engine for automobile.

The air flow pipes 21 and 22 are hollow pipes. Specific pipe shapes of the air flow pipes 21 and 22 are determined depending on various usages. As necessary, the air flow pipes 21 and 22 are formed into straight-pipe shapes, curving shapes, bent shapes, or the like. The air flow pipes 21 and 22 may be rigid pipes, or hoses having flexibility. The air flow pipes 21 and 22 are preferably formed of a material having air impermeability. However, a part or all of the air flow pipes 21 and 22 may be formed of a material having air permeability. On a part of the air flow pipes 21 and 22, a through-hole (for example, a drain hole or a tuning hole) communicated with the inside and outside of the pipe may be disposed.

The expansion chamber 23 having a hollow shape has a cuboid shape. Especially, the shape of the expansion chamber 23 is preferably square as viewed from a direction perpendicular to a central axis m21 of the first pipe 21 and a central axis m22 of the second pipe 22. The internal space of the expansion chamber 23 is not necessary to form a cuboid shape in a strict sense. A corner R, a draft taper, an inclination, or the like may be provided. Among surfaces that define the chamber having the cuboid shape, some surfaces may be formed into curved surfaces like a cylindrical surface, a spherical surface, or the like. It is only necessary that the internal space of the chamber forms a space having a cuboid shape as a whole. On the expansion chamber wall, a rib, a bead, or the like for reinforcement may be formed. The material of the expansion chamber 23 is not specifically limited. Typically, a material having the air impermeability, for example, thermoplastic resin such as polypropylene resin is preferably used.

The first pipe 21 is coupled to an approximate center C21 of a first surface P21 of the expansion chamber 23. It is not necessary that the central axis m21 of the first pipe 21 at the coupling portion passes through the center C21 of the first surface P21 in a strict sense. The central axis m21 may be out of the center C21 of the surface P21. However, preferably, a distance between the center C21 of the first surface P21 and the central axis m21 on the first surface P21 is 20% or less of a second-direction length LY2 described later of the chamber 23.

The second pipe 22 is coupled to an approximate center of a second surface P22 of the expansion chamber 23 adjacent to the first surface P21. It is not necessary that the central axis m22 of the second pipe 22 at the coupling portion passes through the center of the second surface P22 in a strict sense. The central axis m22 may be out of the center of the surface P22. However, preferably, a distance between the center of the second surface P22 and the central axis m22 on the second surface P22 is 20% or less of a first-direction length LX2 described later of the chamber 23. In the expansion chamber 23 having the cuboid shape, the second surface P22 adjacent to the first surface P21 is, comparing the expansion chamber 13 to a die, any of surfaces "2," "3," "4," and "5," when the first surface is a surface "1."

In other words, the first pipe 21 and the second pipe 22 are mounted on the expansion chamber 23 such that the respective central axes m21 and m22 at the coupling portions of these pipes are approximately perpendicular to one another. The silencer 210, as a whole, has an air flow passageway bent to about 90 degrees at a part of the expansion chamber 23.

When the silencer 210 is used, an end of the first pipe 21 is coupled to a noise source. That is, when the silencer 210 is used in the intake system of the automobile engine, as described above, the first pipe 21 is coupled to the engine that is the noise source. An end of the second pipe 22 is coupled to the intake port side. When the silencer 210 is, for example, used in the air flow passageway of the air conditioner, the first pipe 21 is coupled to the fan or the motor that is the noise source.

An internal structure of the expansion chamber 23 will be described. Here, in FIGS. 9 and 10, it is defined that a normal direction of the first surface P21 of the expansion chamber 23 is a first direction X2, a normal direction of the second surface P22 of this chamber is a second direction Y2, and then, a direction perpendicular to the first direction X2 and the second direction Y2 is a third direction Z2. It is preferable that the central axis m21 of the first pipe 21 near the coupling portion be parallel to the first direction X2, and further, the central axis m22 of the second pipe 22 near the coupling portion is parallel to the second direction Y2.

Inside the expansion chamber 23, on a third surface P23 opposed to the first surface P21 of this chamber, a partition 24 is disposed upright extending in the first direction X2 from this surface toward the first surface P21. That is, the partition 24 is disposed in the internal space of the expansion chamber 23 such that the partition 24 extends from the third surface P23 toward the first surface P21. Here, the third surface P23 opposed to the first surface P21 is, comparing the expansion chamber 13 to the die, a surface "6," when the first surface P21 is the surface "1."

As illustrated in a lower-side view in FIG. 10, as viewed from a direction of the central axis m22 of the air flow pipe 22, the partition 24 is disposed to be continuous with upper and lower sidewalls 23a and 23b of the expansion chamber 23. In the lower-side view in FIG. 10, a right side of the internal space of the expansion chamber 23 is partitioned into a front side and a back side in a depth direction of the paper by the partition 24. Thereby, as in a upper-side view in FIG. 10, as viewed from the third direction Z2, the internal space of the expansion chamber 23 partially partitioned by the partition 24 has an toppled U shape whose right side is open.

Then, for a position of the partition 24 in the second direction Y2 on the third surface P23, such that the central axis m21 of the first pipe 21 is substantially included in the partition 24, the partition 24 is disposed on the third surface P23. The central axis m21 of the pipe 21 is not necessarily completely included in the partition 24. To the extent that the advantageous effect of the silencer in this embodiment is not undermined, the partition 24 may be inclined with respect to the central axis m21. The central axis m21 is not necessarily included in the partition 24 in a strict sense. However, in this case, the shortest distance between the central axis m21 and the partition 24 is within 20% of the second-direction length LY2 of the expansion chamber 23.

A height H2 of the partition 24 in the first direction X2 is preferably ⅕ to ⅔ of the first-direction length LX2 of the expansion chamber 23, and more preferably ¼ to ½.

In addition to the partition 24, inside the expansion chamber 23, a protrusion such as a rib or a bead may be formed. However, in this case, this protrusion is preferably formed not to inhibit as much as possible the action of the partition described below. On the other hand, the partition 24 may act as a reinforcing member like a rib or a bead.

The silencer 210 in the above-described second embodiment can be manufactured using a known manufacturing technology, for example, injection molding or blow molding of the thermoplastic resin. The expansion chamber 23 can be manufactured by blow molding, or by welding of two separate bodies produced by injection molding. The air flow pipes 21 and 22 can be shaped by blow molding or the like. The expansion chamber 23 can be coupled to the air flow pipes 21 and 22 one another by known coupling structure or coupling method. The coupling portions of the expansion chamber 23 to the air flow pipes 21 and 22 are preferably sealed as necessary.

A description will be given of function and advantageous effect of the silencer 210 in the above-described second embodiment. The silencer 210 in the second embodiment provides silencing effect similar to that of a silencer including an ordinary expansion chamber, in a relatively low frequency range (for example, a frequency range with 1000 Hz or less). In a relatively high frequency range (for example, a frequency range with 1000 Hz to 2500 Hz), in the internal space of the expansion chamber 23 of the silencer 210, by the partition 24 having a specific form, a specific resonance mode appears at a specific frequency. This can effectively enhance the silencing characteristics around such a specific frequency.

The above-described advantageous effect will be described by comparing Working Example 2 with Comparative Example 2 using a result of acoustic analysis simulation.

Working Example 2

As a working example corresponding to the above-described embodiment, an acoustic model of the silencer having the following specification was created.

First pipe 21: a straight pipe having a diameter with 60 mm and a length with 230 mm Second pipe 22: a straight pipe having a diameter with 60 mm and a length with 250 mm Expansion chamber 23: first-direction length LX2=98 mm, second-direction length LY2=100 mm, and further, third-direction length LZ2=80 mm The first pipe 21 is coupled to the center of the first surface P22 of the chamber. The second pipe 22 is coupled to the center of the second surface P22 of the chamber. The central axis m21 of the first pipe 21 substantially intersects with the central axis m22 of the second pipe 22.

The partition 24 is positioned on the third surface P23 in such a manner that the central axis m21 of the first pipe 21 is included in the partition 24. The height H2 of the partition 24=33 mm.

Comparative Example 2

For comparison, a silencer having an identical configuration except that the partition 24 is not disposed in the internal space of the expansion chamber 23 was created as an acoustic model. This acoustic model was used for Comparative Example 2.

Figure 14:
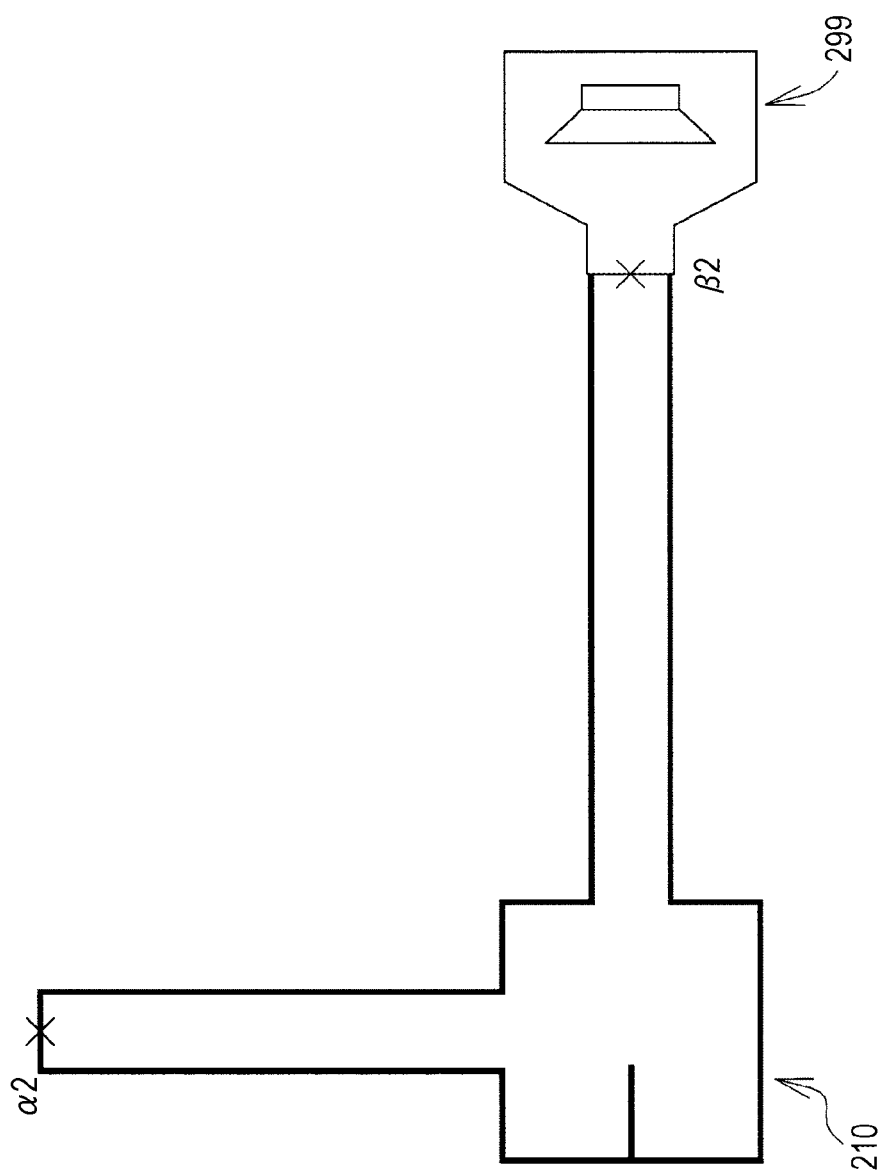
FIG. 14 is a schematic diagram illustrating a method that measures an amount of acoustic attenuation.

In Working Example 2 and Comparative Example 2, to examine their silencing effects, acoustic analysis was performed to obtain an amount of acoustic attenuation. The amount of acoustic attenuation is an index that evaluates the silencing effect. As in FIG. 14, assuming that an end (an end of the first pipe) β2 at the noise source side of the silencer as an examination object was coupled to a speaker device 299 that performs acoustic excitation, a simulation model that performs the acoustic excitation was created. An exit-side (an end opening α2 of the second pipe) sound pressure Pα2 (a sound pressure measured at the position α2) and a sound-source-side (a terminal portion β2 of the first pipe) sound pressure Pβ2 (a sound pressure measured at the position β2) were measured when the acoustic excitation was performed. A ratio (Pβ1/Pα1) of both was calculated as the amount of acoustic attenuation. A large value of the amount of acoustic attenuation means that the silencing effect is large. A small value of the amount of acoustic attenuation means that the silencing effect is small. The acoustic simulation was performed by a finite element method (FEM method).

Figure 11:
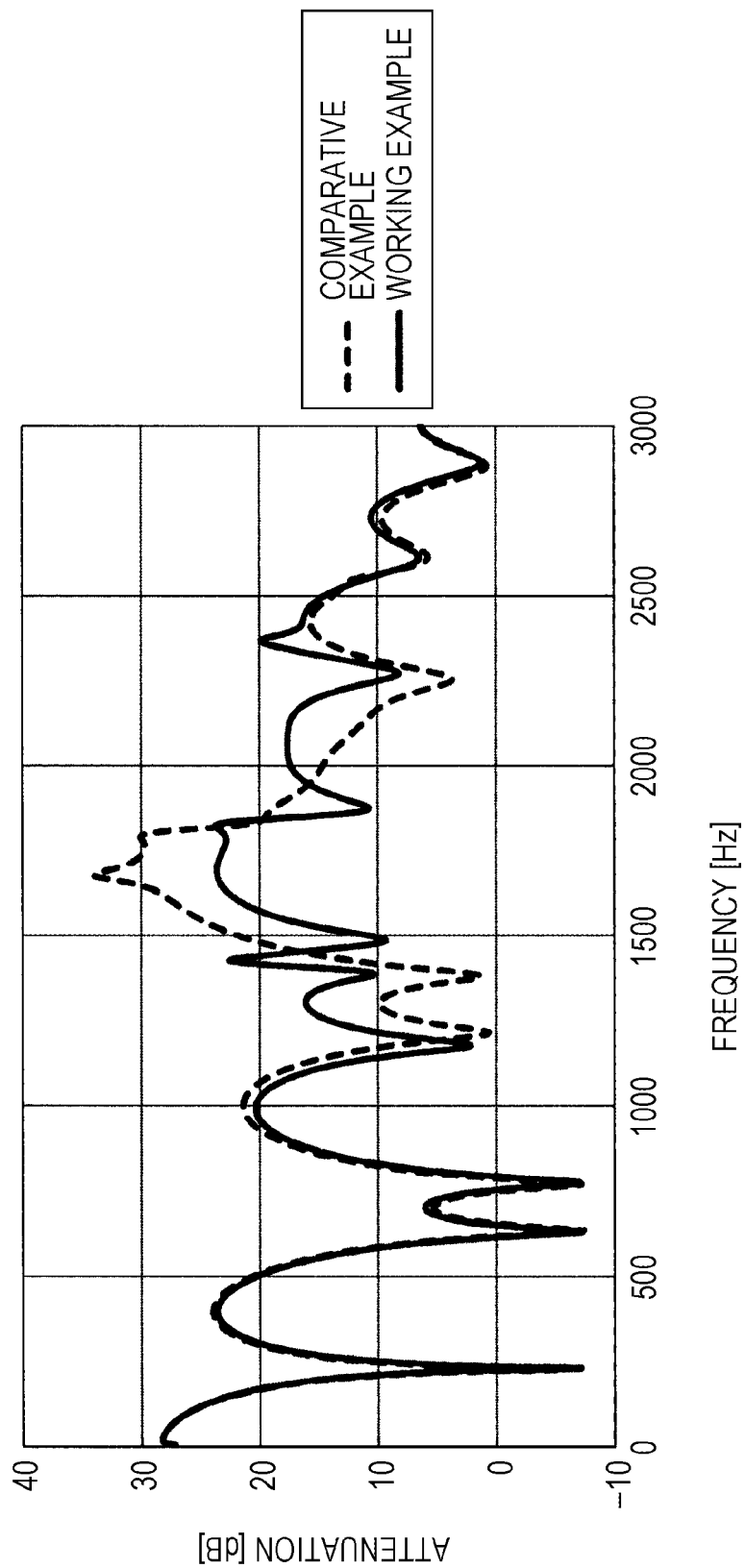
FIG. 11 is a view illustrating silencing effect of a working example of the silencer in the second embodiment.

FIG. 11 illustrates the simulation result of the amounts of acoustic attenuation in Working Example 2 and Comparative Example 2. In a region where the frequency is relatively low, up to almost 1000 Hz, in Working Example 2 and Comparative Example 2, almost identical amounts of acoustic attenuation (Attenuation in FIG. 11) are shown. It is understood that, in such a frequency range, the silencing effect similar to that of the silencer having the typical expansion chamber can be obtained.

In the silencer 210 in Working Example 2, compared with the Comparative Example 2, increase of the amount of acoustic attenuation whose peaks are at 1335 Hz (a first resonant frequency f21) and at 2355 Hz (a second resonant frequency f22) is seen. That is, in the frequency range (1200 Hz to 1450 Hz) around the first resonant frequency f21 and the frequency range (2000 Hz to 2400 Hz) around the second resonant frequency f22, the amount of acoustic attenuation of the silencer 210 in Working Example 2 is higher than that in Comparative Example 2.

Figure 12:
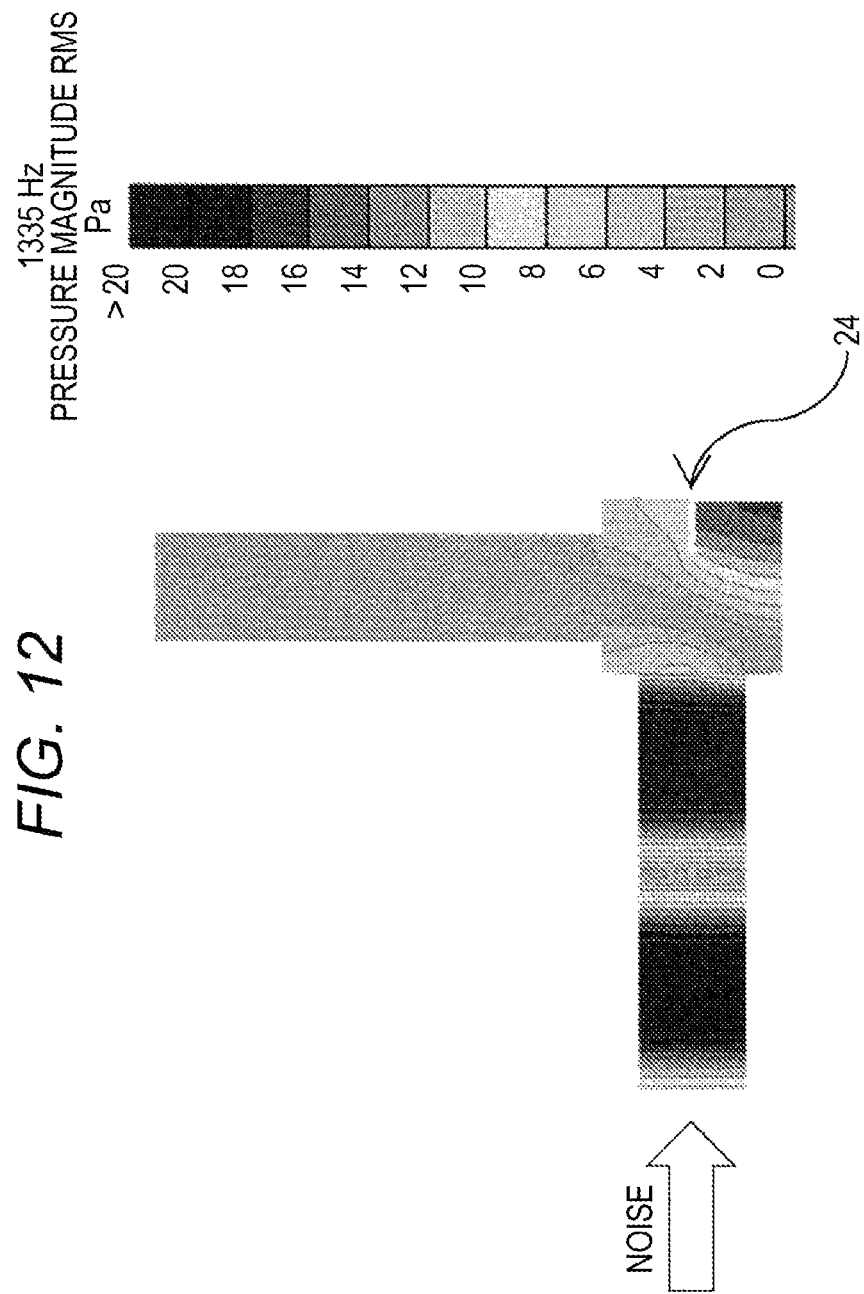
FIG. 12 is a view illustrating a resonance mode around a first resonant frequency in Working Example 2.

FIG. 12 illustrates a sound pressure distribution (resonance mode) inside the expansion chamber 23 in Working Example 2 around the first resonant frequency f21 (1335 Hz). These sound pressure distributions are sound-pressure distribution diagrams at a cross-sectional surface of the silencer 210 including the pipe central axes m21 and m22, as viewed from the third direction Z2.

In Working Example 2 illustrated in FIG. 12, the partition 24 is disposed in the expansion chamber 23 as follows. That is, as viewed from the third direction Z2, the partition 24 is disposed on the third surface P23 such that the internal space of the expansion chamber 23 partially partitioned by the partition 24 has a U shape, more specifically, such that the central axis m21 of the first pipe 21 is mostly included in the partition 14. In view of this, the resonance mode at the first resonant frequency f21 varies. That is, according to the analysis of the resonance mode observed in Working Example 2, the sound pressure in the internal space of the expansion chamber 23 was high in the lower right space separated by the partition 24, and decreased toward the left-side space. That is, the partition 24 generates the air resonance mode in which the air moves in a right-left direction of the internal space of the expansion chamber 23. In this resonance mode, near the coupling portion of the expansion chamber 23 to the second pipe 22, the sound pressure was low. Furthermore, in this resonance mode, near the coupling portion of the expansion chamber 23 to the second pipe 22, the air vibrates to flow in a direction perpendicular to the central axis m22 of the second pipe 22. Therefore, movement of the air between the second pipe 22 and the expansion chamber 23 is also less likely to occur.

With such a relationship between the resonance mode and the position of the coupling portions to the first pipe 21 and the second pipe 22, in Working Example 2, in the frequency range around the first resonant frequency f21, the sound pressure that occurs in the second pipe 22 is smaller than the sound pressure that occurs in the first pipe 21. This increases the amount of acoustic attenuation.

Thus, with the silencer 210 in the second embodiment, the partition 24 having the specific form disposed in the internal space of the expansion chamber 23 can generate the resonance mode to effectively enhance the amount of acoustic attenuation. As a result, the silencing characteristics can be enhanced around the specific frequency.

In view of generating the resonance mode as described above more effectively by disposing partition, the height H2 of the partition 24 measured along the first direction X2 is preferably ⅕ to ⅔ of the first-direction length LX2 of the chamber, more preferably ¼ to ½. When the height H2 is small, the resonance mode as in FIG. 12 becomes less likely to appear. When the height H2 is too large, air flow resistance of the silencer 210 possibly increases.

The first resonant frequency f21 where the resonance mode as illustrated in FIG. 12 occurs can be adjusted as follows. When the first-direction length LX2 or the second-direction length LY2 of the expansion chamber is increased, the first resonant frequency f21 varies in a lower direction. When the height H2 of the partition 24 is increased, the first resonant frequency f21 varies in a slightly lower direction.

When the first-direction length LX2 and the second-direction length LY2 of the expansion chamber 23 are set to about 70 to 150 mm, and further, the height H2 of the partition 24 is set to about 25 to 70 mm, the first resonant frequency f21 can be moved to between 1000 Hz and 1500 Hz. As a result, as the silencer of the intake system for automobile engine including a turbocharger, especially preferred characteristics can be obtained.

Figure 13:
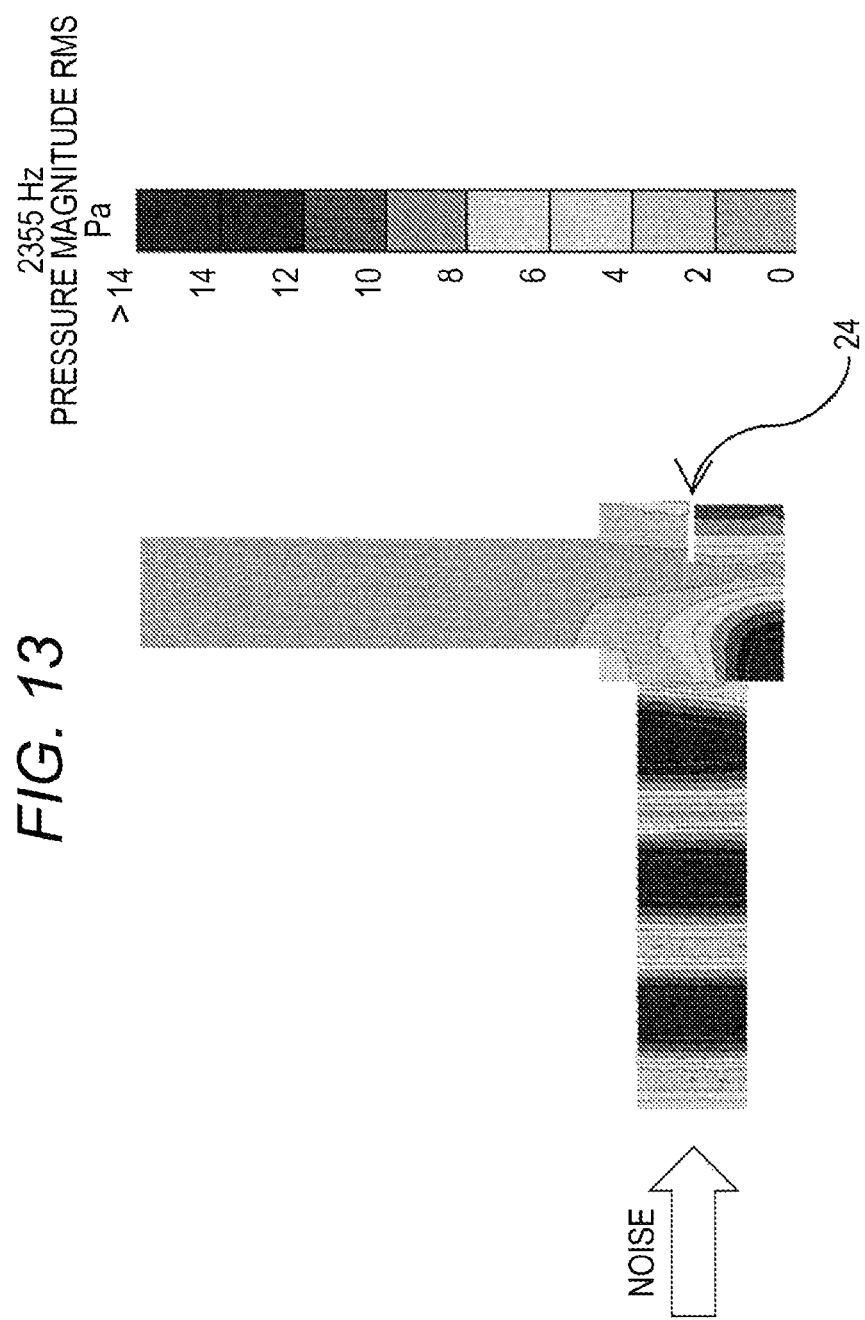
FIG. 13 is a view illustrating a resonance mode around a second resonant frequency in Working Example 2.

In above-described Working Example 2, also around the second resonant frequency f22, the improvement of the amount of acoustic attenuation is seen. FIG. 13 illustrates a sound pressure distribution (resonance mode) inside the expansion chamber around the second resonant frequency f22 (2355 Hz) in Working Example 2.

In Working Example 2 in FIG. 13, high sound pressure occurs in the lower left space, and the lower right space separated by the partition 24, in the opposite phase. Then, in parts between them, and in the upper space, regions where the sound pressure is low appear. Also in this resonance mode, near the coupling portion of the expansion chamber 23 to the second pipe 22, the vibrating air flows in the direction perpendicular to the central axis m22 of the second pipe 22. Therefore, the movement of the air between the second pipe 22 and the expansion chamber 23 is also less likely to occur.

With such a relationship between the resonance mode and the position of the coupling portions to the first pipe 21 and the second pipe 22, in Working Example 2, also around the second resonant frequency f22, the sound pressure of the second pipe 22 is low. This increases the amount of acoustic attenuation. The improvement of the amount of acoustic attenuation around the second resonant frequency f22 is sometimes not significantly seen as much as in above-described Working Example 2. This is because the second resonant frequency f22 with such resonant mode is a relatively high frequency.

The embodiment of this disclosure is not limited to the above-described second embodiment. Various kinds of modification can be applied to the above-described second embodiment to be performed as another embodiment of this disclosure. The following describes another embodiment of this disclosure. In the following description, mainly, parts different from those in the second embodiment are described. The detailed description for the parts identical to those in the second embodiment is omitted. These other embodiments can be performed such that parts of them are combined or replaced one another.

Insofar as the resonance mode as described above occurs, the form of the partition 24 may be changed. For example, the partition 24 may be a plate-shaped partition disposed upright from the third surface P23 toward an inside of the expansion chamber, or may be a pleated partition formed so that a surface shape of the third surface P23 is folded inward.

In the second embodiment, the partition 24 has a flat-plate shape extending in the third direction Z2. However, the partition 24 may be curved. In the second embodiment, the height H2 of the partition 24 is constant over the third direction Z2. However, the height H2 of the partition 24 may be changed over the third direction Z2. It is not necessary that the partition 24 completely partitions a right side part of the internal space of the expansion chamber 23. At the partition 24, a through-hole or a slit may be disposed. Two or more partitions may be disposed. However, in terms of the easiness of acoustic control in the chamber, it is preferable that one partition be disposed.

In the description for the above-described second embodiment, the example where the silencer 210 is constituted of the pipes 21 and 22 and the expansion chamber 23 that are independent from other members has been shown. These pipes 21 and 22 or the expansion chamber 23 are not necessarily independent. The pipes 21 and 22 or the expansion chamber 23 may be integrated with other members. For example, a part of an air cleaner module included in the intake system for automobile engine, or a part of an air flow device of cooling air may constitute the above-described silencer 210. That is, the silencer 210 may be integrally incorporated in such an air cleaner module or an air flow device.

The silencer according to the embodiment of this disclosure may be the following first to fourth silencers.

The above-described first silencer is a silencer that muffles a noise transmitted into a pipe, the silencer includes an expansion chamber having a cuboid shape, a first pipe coupled to an approximate center of a first surface of the chamber, and a second pipe coupled to an approximate center of a second surface of the chamber adjacent to the first surface, an end of the first pipe is coupled to a noise source, such that a normal direction of the first surface is set to a first direction, a normal direction of the second surface is set to a second direction, and a direction perpendicular to the first direction and the second direction is set to a third direction, a partition is disposed upright to extend in the second direction from a surface opposed to the second surface of the chamber, and as viewed along the third direction, the partition is disposed such that an internal space of the chamber is partitioned in a U shape by the partition, and such that a position in the first direction of the partition approximately matches a position in the first direction of a center of a coupling portion of the second pipe.

The above-described second silencer may be the above-described first silencer, in which a height of the partition measured along the second direction is ¼ to ⅔ of a length in the second direction of the chamber.

The above-described third silencer is a silencer that muffles a noise transmitted into a pipe, the silencer includes an expansion chamber having a cuboid shape, a first pipe coupled to an approximate center of a first surface of the chamber, and a second pipe coupled to an approximate center of a second surface of the chamber adjacent to the first surface, an end of the first pipe is coupled to a noise source, such that a normal direction of the first surface is set to a first direction, a normal direction of the second surface is set to a second direction, and a direction perpendicular to the first direction and the second direction is set to a third direction, a partition is disposed upright to extend in the first direction from a surface opposed to the first surface of the chamber, and as viewed along the third direction, the partition is disposed such that an internal space of the chamber is partitioned in a U shape by the partition, and such that a position in the second direction of the partition approximately matches a position in the second direction of a center of a coupling portion of the first pipe.

The above-described fourth silencer may be the above-described third silencer, in which a height of the partition measured along the first direction is ⅕ to ⅔ of a length in the first direction of the chamber.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

The silencer in the above-described embodiment is, for example, applicable to the intake system for automobile engine. Accordingly, this silencer has a high industrial applicability.

What is claimed is:

1. A silencer comprising:
   an expansion chamber having a cuboid shape;
   a first pipe for being coupled to a noise source, the first pipe being coupled to an approximate center of a first surface of the expansion chamber; and
   a second pipe coupled to an approximate center of a second surface of the expansion chamber adjacent to the first surface, wherein
   the expansion chamber has an internal space and only a single partition in the internal space,
   the partition is disposed upright on a third surface of the expansion chamber opposed to the second surface of the expansion chamber to extend from the third surface toward the second surface,
   the second pipe has a central axis substantially included in the partition, and
   a direction normal to the first surface of the expansion chamber is a first direction, a direction normal to the second surface of the expansion chamber is a second direction, a direction perpendicular to the first direction and the second direction is a third direction, and when viewed from the third direction, the internal space of the expansion chamber has a U shape.

2. The silencer according to claim 1, wherein
the partition has a height in a normal direction of the second surface in a range of ¼ to ⅔ of a length of the expansion chamber measured in the normal direction of the second surface.

3. A silencer comprising:

an expansion chamber having a cuboid shape;

a first pipe for being coupled to a noise source, the first pipe being coupled to an approximate center of a first surface of the expansion chamber; and a second pipe coupled to an approximate center of a second surface of the expansion chamber adjacent to the first surface, wherein the expansion chamber has an internal space and only a single partition in the internal space, the partition is disposed upright on a third surface of the expansion chamber opposed to the first surface of the expansion chamber to extend from the third surface toward the first surface, the first pipe has a central axis included in the partition, and a direction normal to the first surface of the expansion chamber is a first direction, a direction normal to the second surface of the expansion chamber is a second direction, a direction perpendicular to the first direction and the second direction is a third direction, and when viewed from the third direction, the internal space of the expansion chamber has a U shape.

4. The silencer according to claim 3, wherein
the partition has a height in a normal direction of the first surface in a range of ⅕ to ⅔ of a length of the expansion chamber measured in the normal direction of the first surface.

5. The silencer according to claim 1, wherein
a distance between a center of the first surface and a central axis of the first pipe on the first surface is 20% or less of a length of the expansion chamber in the second direction.

6. The silencer according to claim 1, wherein
a distance between a center of the second surface and a central axis of the second pipe on the second surface is 20% or less of a length of the expansion chamber in the first direction.

7. The silencer according to claim 1, wherein
a distance between a central axis of the second pipe and the single partition in the first direction is within 20% of a length of the expansion chamber in the first direction.

8. The silencer according to claim 1, wherein
the internal space of the expansion chamber consists of the single partition.

9. The silencer according to claim 3, wherein
a distance between a center of the first surface and a central axis of the first pipe on the first surface is 20% or less of a length of the expansion chamber in the second direction.

10. The silencer according to claim 3, wherein
a distance between a center of the second surface and a central axis of the second pipe on the second surface is 20% or less of a length of the expansion chamber in the first direction.

11. The silencer according to claim 3, wherein
a distance between a central axis of the first pipe and the single partition in the second direction is within 20% of a length of the expansion chamber in the second direction.

12. The silencer according to claim 3, wherein
the internal space of the expansion chamber consists of the single partition.

* * * * *